(12) United States Patent
Nakayama

(10) Patent No.: US 8,142,655 B2
(45) Date of Patent: Mar. 27, 2012

(54) FILTRATION UNIT

(75) Inventor: Tsuyoshi Nakayama, Ichikawa (JP)

(73) Assignee: Tsukishima Kikai Co., Ltd., Tokyo (JP)

( * ) Notice: Subject to any disclaimer, the term of this patent is extended or adjusted under 35 U.S.C. 154(b) by 606 days.

(21) Appl. No.: 12/085,774

(22) PCT Filed: Nov. 13, 2006

(86) PCT No.: PCT/JP2006/322529
§ 371 (c)(1),
(2), (4) Date: May 29, 2008

(87) PCT Pub. No.: WO2007/066471
PCT Pub. Date: Jun. 14, 2007

(65) Prior Publication Data
US 2009/0283465 A1  Nov. 19, 2009

(30) Foreign Application Priority Data
Dec. 9, 2005  (JP) ................ P2005-355781

(51) Int. Cl.
| B01D 24/10 | (2006.01) |
| B01D 24/46 | (2006.01) |
| B01D 36/02 | (2006.01) |
| B01D 65/02 | (2006.01) |

(52) U.S. Cl. ............... 210/257.2; 210/259; 210/266; 210/274; 210/282; 210/291; 210/321.69; 210/484; 210/502.1

(58) Field of Classification Search ............ 210/257.2, 210/259, 266, 274, 282, 289, 321.69, 484, 210/485, 502.1, 616, 617, 618, 291
See application file for complete search history.

(56) References Cited

U.S. PATENT DOCUMENTS
4,876,288 A * 10/1989 Herding et al. ............ 521/53
5,217,616 A *  6/1993 Sanyal et al. ............ 210/617
(Continued)

FOREIGN PATENT DOCUMENTS
EP      1522524      4/2005
(Continued)

OTHER PUBLICATIONS
European Search Report.

*Primary Examiner* — Matthew Savage
(74) *Attorney, Agent, or Firm* — Hoffman & Baron, LLP

(57) ABSTRACT

A filtration unit (A) is immersed in raw water (W) that is held inside a reservoir tank, and includes a membrane module (5) that filters the introduced raw water (W). This filtration unit (A) includes a casing (3) which is in the shape of a box having a bottom and includes the membrane module (5) housed therein, and an activated carbon cartridge (4) inside which activated carbon is provided in cartridge form. Inside the casing (3) are provided an intake port that is used to introduce the raw water into the interior of the casing, and an opening/closing device that is installed on this intake port and controls a flow of the raw water into the interior of the casing, and the activated carbon cartridge (4) side and the membrane module (5) side are separated so as to allow the raw water (W) introduced into the interior of the casing 3 to circulate from the activated carbon cartridge (4) side to the membrane module (5) side.

12 Claims, 6 Drawing Sheets

U.S. PATENT DOCUMENTS

| | | | |
|---|---|---|---|
| 5,437,787 A | * | 8/1995 | Ishida et al. .................. 210/189 |
| 5,439,590 A | * | 8/1995 | Steffan .......................... 210/616 |
| 5,788,838 A | * | 8/1998 | Yamasaki et al. ............. 210/150 |

FOREIGN PATENT DOCUMENTS

| | | |
|---|---|---|
| JP | 05-131195 | 5/1993 |
| JP | 07-204642 | 8/1995 |
| JP | 07299492 | 11/1995 |
| JP | 07-323295 | 12/1995 |
| JP | 08-252571 | 10/1996 |
| JP | 10-128358 | 5/1998 |
| JP | 10290993 | 11/1998 |
| JP | 11179385 | 7/1999 |
| JP | 2001000990 | 1/2001 |
| JP | 2003-190985 | 7/2003 |
| JP | 2003-251337 | 9/2003 |
| JP | 2003-3491122 | 11/2003 |
| JP | 2004-337787 | 12/2004 |

* cited by examiner

FILTRATION UNIT

TECHNICAL FIELD

The present invention relates to a filtration unit that includes a membrane module that is immersed in raw water and filters introduced raw water.

Priority is claimed on Japanese Patent Application No. 2005-355781, filed Dec. 9, 2005, the contents of which are incorporated herein by reference.

BACKGROUND ART

Conventionally, drinking water treatment plants such as the one disclosed in Patent Document 1 are used in order to obtain purified water by filtering raw water from rivers, lakes, marshes, and ponds and the like. In the treatment plant described in Patent Document 1, a partitioning wall is provided in a treatment tank in which raw water is stored so as to divide this treatment tank into two compartments. One of the compartments is used as a microorganism treatment section that treats raw water by adding thereto activated carbon such as granulated activated carbon to whose surface, in particular, aerobic microorganisms are adhered. The other compartment is used as a membrane filtration section that filters raw water that is fed from the one compartment by means of a filtration membrane unit that is placed inside this compartment.

In the drinking water treatment plant disclosed in Patent Document 1, raw water from which coarse matter and the like has been removed is supplied to the microorganism treatment section via a separation tank that separates coarse matter and easily precipitated matter by means of precipitation, and a circulatory flow is formed in the raw water while the raw water is aerated by means of an aeration apparatus which is provided in a bottom portion of this microorganism treatment section. By then stirring the activated carbon into the raw water by means of this circulatory flow, organic matter and the like can be absorbed and removed from the raw water. Furthermore, the raw water which has been treated in this way in the microorganism treatment section is supplied to the membrane filtration section by overflowing the top of the partitioning wall, and undergoes filtration treatment by being filtered by means of a filtration membrane unit that is formed by a plurality of hollow flat membrane modules. The filtered water which is obtained in this manner is then supplied as pure water to a storage tank which is provided outside the treatment tank.

An activated carbon outflow prevention baffle plate (referred to below simply as a 'baffle plate') is provided on a top end portion of a surface of the partitioning wall that faces towards the microorganism treatment section side. This baffle plate protrudes towards the inner side of the microorganism treatment section, and is provided so as to slope diagonally downwards towards a distal end thereof. As a result, the activated carbon which is being stirred by means of the circulatory flow in the microorganism treatment section collides with the baffle plate and is restricted or prevented from rising any further. Moreover, any activated carbon which moves above the baffle plate falls onto the top surface of the baffle plate due to its specific gravity being greater than that of the raw water, and drops into the interior of the microorganism treatment section because of the slope of the baffle plate and is recovered. Accordingly, in this drinking water treatment plant, although a structure is employed in which raw war is supplied to the membrane filtration section from the microorganism treatment section by overflowing the top of the partitioning wall, activated carbon from the microorganism treatment section generally does not flow into the filtration membrane section together with the overflowing raw water.

Patent Document 1: Japanese Patent No. 3491122

DISCLOSURE OF INVENTION

Problems to be Solved by the Invention

However, in the above described drinking water treatment plant, suspended matter that is smaller than coarse matter and easily precipitated matter but is larger than organic matter and does not become absorbed by the activated carbon is able to flow in large quantities into the membrane filtration section. This suspended matter is stirred by the aeration apparatus and remains floating in the raw water when the raw water is being filtered by the membrane modules. Because of this, the problem arises that the suspended matter adheres to outer surfaces of the membrane modules and, when the raw water is being filtered by the membrane modules, causes blockages in the internal holes in the membrane modules, so that there is a deterioration in the filtration efficiency.

Moreover, in the above described drinking water treatment plant, activated carbon that is circulated inside the microorganism treatment section by air discharged from the aeration apparatus generally does not flow into the membrane filtration section due to the baffle plate being provided and due to the specific gravity of the activated carbon being greater than that of the raw water. However, there is a slight possibility that activated carbon which is in a floating state will flow into the membrane filtration section. If activated carbon does flow into the membrane filtration section, the problem arises that the amount of activated carbon inside the microorganism treatment section will be decreased, so that it will not be possible to perform a predetermined treatment at a predetermined time. Alternatively, the problem arises that activated carbon that has flowed into the membrane filtration section becomes adhered to the outer surfaces of the membrane modules of the filtration membrane unit which is housed inside the membrane filtration section. Consequently, this causes blockages in the internal holes in the membrane modules and, as a result, causes a reduction in the filtration efficiency.

Furthermore, in the above described drinking water treatment plant, a water tank is formed by a treatment tank that is formed by a microorganism treatment section to which activated carbon is added and by a membrane filtration section which includes a filtration membrane unit, and it is necessary to provide together with this treatment tank a separation tank that takes in raw water from, for example, rivers or lakes and marshes and removes coarse matter from this raw water while temporarily holding the raw water, and a water feed pipe that includes a pump and connects this separation tank to the treatment tank. However, the problem has existed that a considerable land area is required to install the treatment tank, separation tank, and water feed pipe in order to purify this raw water.

Means for Solving the Problem

The present invention was conceived in view of the above described circumstances and it is an object thereof to provide a filtration unit that is immersed in raw water that needs to undergo purification treatment and is capable of purifying this raw water, and that is able to properly purify raw water while preventing activated carbon escaping to the membrane module side.

In order to achieve the aforementioned object, the present invention employs the following means.

The filtration unit of the present invention is a filtration unit that is immersed in raw water that is held inside a reservoir tank or a reservoir pond, and includes a membrane module that filters the introduced raw water, including: the filtration unit includes a casing which is in the shape of a box having a bottom and includes the membrane module housed therein; and an activated carbon cartridge inside which activated carbon is provided in cartridge form, wherein, inside the casing, are provided an intake port that is used to introduce the raw water into the interior of the casing, and an opening/closing device that is installed on this intake port and controls a flow motion of the raw water into the interior of the casing, and the activated carbon cartridge side and the membrane module side are separated so as to allow the raw water introduced into the interior of the casing to circulate from the activated carbon cartridge side to the membrane module side.

Here, it is desirable that the casing include another opening/closing device that controls the circulation of the raw water that is circulated from the activated carbon cartridge side to the membrane module side between the activated carbon cartridge side and the membrane module side.

Moreover, in the filtration unit of the present invention, in order to separate the activated carbon cartridge side and the membrane module side of the casing such that raw water is able to circulate from the activated carbon cartridge side to the membrane module side, the casing may include a first casing which is in the shape of a box having a bottom and that internally houses the activated carbon cartridge; a second casing which is in the shape of a box having a bottom and that internally houses the membrane module; a connecting pipe that connects together the interiors of the first casing and the second casing.

A partitioning wall may be provided in the casing in order to separate the activated carbon cartridge from the membrane which are housed in the casing, and in order to allow the raw water which is introduced into the interior of the casing to circulate from the activated carbon cartridge side to the membrane module side.

Furthermore, a connection port may be provided that connects the activated carbon cartridge to the membrane module.

Furthermore, in the filtration unit of the present invention, it is desirable that the casing may include an air diffusion apparatus that discharges air into the introduced raw water below the membrane module and below the activated carbon cartridge. It is even more desirable that, in addition to this, a discharge pipe may be provided that discharges the raw water inside the casing to the outside of the casing.

Furthermore, in the filtration unit of the present invention, the intake port may be provided in a side wall of the casing such that, in a state in which the filtration unit has been immersed in the raw water, at least a portion of the intake port is positioned in the raw water.

Furthermore, in the filtration unit of the present invention, a partitioning plate may be provided so as to surround the intake port when at least a portion of the intake port is in contact with the surface of the raw water in a state in which the filtration unit has been immersed in the raw water, or when the entire intake port is in the raw water and at least a portion of the intake port is positioned adjacent to the surface of the raw water.

Furthermore, in the filtration unit of the present invention, a discharge pipe may be provided that discharges the raw water inside the casing, and for one end of the discharge pipe to open in the vicinity of the bottom portion of the casing, and for another end of the discharge pipe to be positioned outside the casing

EFFECTS OF THE INVENTION

According to the filtration unit of the present invention, by immersing a casing in raw water inside a reservoir tank or a reservoir pond, and introducing the raw water into the interior of the casing via an intake port, it is possible to precipitate out suspended matter in the raw water such as that described above inside the reservoir tank or reservoir pond, and to introduce comparatively clean supernatant raw water in which the suspended matter has been reduced. Because of this, it is possible to reduce adhered matter that is adhering to the membrane module, and it is possible to maintain the filtration performance of the membrane module at a high level over a considerable period of time. In addition, because this casing is separated into a side that houses an activated carbon cartridge which is obtained by fixing activated carbon in cartridge form, and a side that houses a membrane module, and because raw water is able to circulate from the activated carbon cartridge side to the membrane module side, it is possible to prevent activated carbon from escaping and allow only the raw water to be circulated to the membrane module side and filtered.

Specifically, in one type of filtration unit of the present invention, as a result of a first casing that houses an activated carbon cartridge being connected by a connecting pipe to a second casing that houses a membrane module, raw water that has been treated by the activated carbon cartridge inside the first casing can be fed to the interior of the second casing. In addition, at this time, as a result of the activated carbon inside the first casing being in cartridge form (i.e., a cartridge case is filled with a large number of activated carbon granules and these are then fixed in place to form an activated carbon cartridge), it does not become dispersed in the raw water inside the first casing, and it is possible to prevent activated carbon escaping together with the raw water that is fed through the connecting pipe from the first casing to the second casing. As a result, there is no change in the amount of activated carbon inside the first casing, and activated carbon does not become adhered to the membrane module filtering the raw water contained in the second casing. Consequently, the purification treatment of raw water can be performed in a favorable state.

Furthermore, in another type of filtration unit of the present invention, by providing a partitioning wall in a single casing, the individual compartments that are separated by this partitioning wall while being able to communicate with each other can be partitioned inside the casing, and the activated carbon cartridge and the membrane module are each housed in their respective compartments. By then feeding raw water from one chamber to the other chamber, it is possible to perform purification treatment of the raw water. At this time, because the activated carbon is in cartridge form, it is possible to prevent activated carbon escaping together with the raw water that is fed from the compartment where the activated carbon cartridge is housed to the compartment where the membrane module is housed. As a result, activated carbon does not become adhered to the membrane module, and the purification treatment of raw water can be performed in a favorable state.

Moreover, in the filtration unit of the present embodiment, an air diffusion apparatus that discharges air into introduced raw water is provided below the activated carbon cartridge and below the membrane module inside the casing. By discharging air into the raw water on the activated carbon cartridge side, a flow motion can be imparted to the raw water, and the activated carbon which is in cartridge form can be brought into contact reliably with the raw water. As a result, it becomes possible to reliably absorb and remove organic matter and the like in raw water using an activated carbon cartridge. Furthermore, as a result of air bubbles from the discharged air coming into contact with the outer surface of the activated carbon, and of the flow motion of the raw water created by the discharged air, it becomes possible to remove adhered matter that has become adhered to the surface of the activated carbon and brought about a consequent deterioration in the absorption performance thereof, so that it becomes possible to treat raw water by properly utilizing the absorption properties of the activated carbon. In addition to this, by discharging air into the raw water inside the casing, it becomes possible to maintain the dissolved oxygen concentration of the raw water at a high level, and when, for example, aerobic microorganisms are adhering to the activated carbon cartridges, organic matter can be decomposed by these aerobic microorganisms, and it is possible to achieve an acceleration in the purification treatment of the raw water.

Moreover, by discharging air into the raw water on the membrane module side, adhered matter that is adhering to the outer surface of the membrane module can be removed by the raw water that is being circulated by the contact with the air bubbles and by the discharge of air, and filtration can be performed under favorable circumstances. Note that when the membrane module is being cleaned by the air bubbles, it is effective if this cleaning is performed in combination with back pressure cleaning in which filtered water is made to flow back into the membrane module.

Furthermore, in the filtration unit of the present invention, as a result of an intake port that is used to introduce raw water into the interior of the casing, and an opening/closing device that is located in this intake port and controls the intake of raw water into the interior of the casing being provided in the casing, it is possible to introduce raw water into the casing by performing a simple operation in which the casing is immersed in raw water and the intake port is opened via the opening/closing device, and it is also possible to perform purification treatment of the introduced raw water.

Moreover, even when the water level inside the casing is raised because of aeration cleaning or back pressure cleaning, it is still possible to prevent back flow of water from the casing by means of this opening/closing device.

Moreover, by providing between the activated carbon cartridge side and the membrane module side in the casing another opening/closing device such as, for example, the connecting pipe or the partitioning wall that controls the circulation of the raw water that is circulated from the activated carbon cartridge side to the membrane module side, when the membrane module is being cleaned by back pressure, it is possible to prevent back flow of the raw water from the membrane module side to the activated carbon cartridge side. Furthermore, by providing a discharge pipe that discharges the raw water inside the casing to the outside, for example, the membrane module can be cleaned while the raw water inside the casing is kept isolated from the outside by the opening/closing device, and raw water in which impurities and the like that have been removed from the membrane module are floating can be discharged to the outside.

DESCRIPTION OF THE REFERENCE NUMERALS

1 . . . First casing,
1a . . . Top end,
1b . . . Bottom end,
1c . . . First side wall,
1d . . . Second side wall,
1e . . . Intake port,
1f . . . Partitioning plate,
1g . . . Bottom portion,
1i . . . Opening/closing valve (Opening/closing apparatus),
2 . . . Second casing,
2a . . . Top end,
2b . . . Bottom end,
2c . . . First side wall,
2d . . . Second side wall,
3 . . . Casing,
4 . . . Active carbon cartridge,
5 . . . Membrane module,
6 . . . First air diffusion apparatus (Air diffuser),
7 . . . Second air diffusion apparatus (Air diffuser),
10 . . . Reservoir tank,
11 . . . First discharge device,
11a . . . First water discharge pipe (Water discharge pipe),
15 . . . Second discharge device,
15a . . . Second water discharge pipe (Water discharge pipe),
17 . . . Second casing lid,
20 . . . Connecting pipe,
20a . . . Opening/closing valve (Other opening/closing device),
30 . . . Casing,
30a . . . Top end,
30b . . . Bottom end,
30c . . . First side wall,
30d . . . Second side wall,
30e . . . Bottom portion,
31 . . . Partition wall,
32 . . . First compartment,
33 . . . Second compartment,
34 . . . Connecting port,
35 . . . Opening/closing valve (Other opening/closing apparatus),
A . . . Filtration unit,
B . . . Filtration unit,
H . . . Water surface portion,
W . . . Raw water

BEST MODE FOR CARRYING OUT THE INVENTION

A filtration unit according to a first embodiment of the present invention will now be described with reference made to FIGS. 1 and 2. The first embodiment of the present invention relates to a filtration unit that includes an activated carbon cartridge which is made up of activated carbon in cartridge form, and a membrane module, and performs purification treatment on raw water by being immersed in the raw water.

Figure 1:
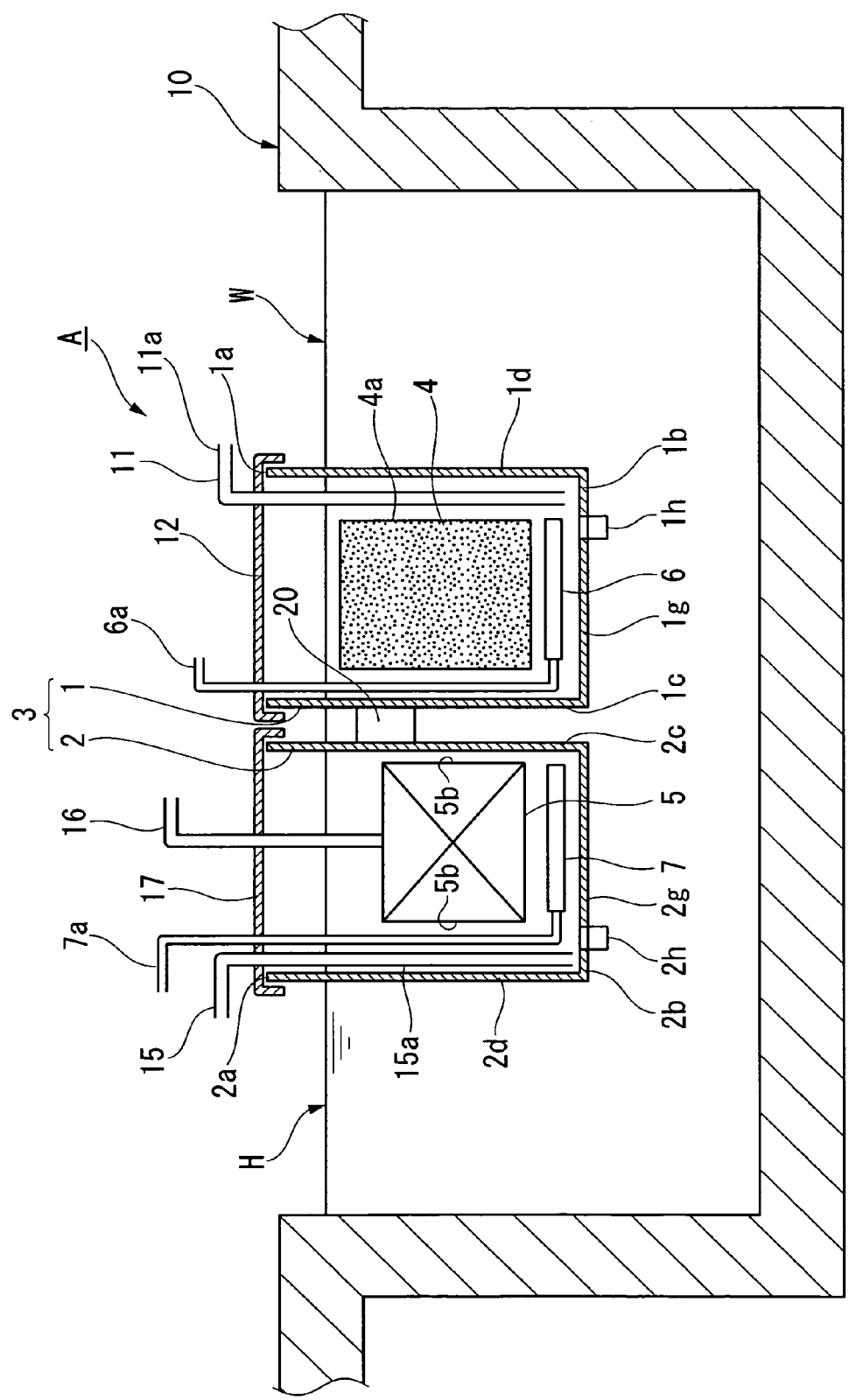
FIG. 1 is a view showing a filtration unit according to a first embodiment of the present invention.
Figure 2:
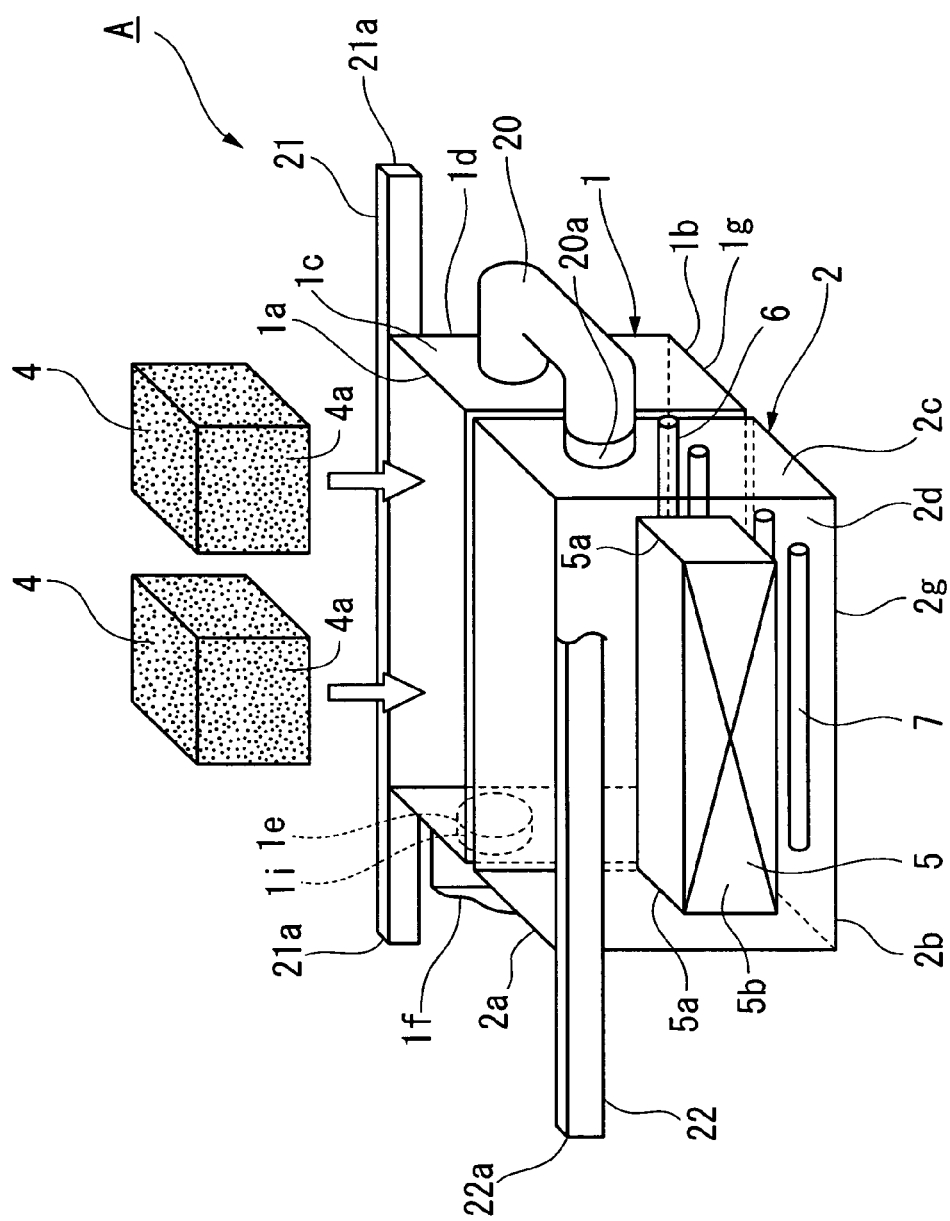
FIG. 2 is a view showing the filtration unit according to the first embodiment of the present invention.

As is shown in FIG. 1 and FIG. 2, a filtration unit A of the present embodiment is formed principally by a casing 3 that is immersed into raw water W and is made up of a first casing 1 that is shaped like a box provided with a bottom and that is able to be placed inside the raw water W and a second casing 2 that is shaped like a box provided with a bottom, an activated carbon cartridge 4 that is housed inside the first casing 1, a membrane module 5 that is housed inside the second casing 2, a first air diffusion apparatus (air diffuser) 6 that is placed below the activated carbon cartridge 4 inside the first casing 1 and discharges air into the raw water W inside the first casing 1, and a second air diffusion apparatus (air diffuser) 7 that is placed below the membrane module 5 inside the second casing 2 and discharges air into the raw water W inside the second casing 2. Here, in the present embodiment, as is shown in FIG. 1, raw water W that is to be filtered by the filtration unit A of the present invention is collected, for example, from rivers or lakes and marshes, and coarse matter and easily precipitated matter is removed therefrom. If necessary, floc may also be formed by the addition of a flocculating agent and then removed. The raw water w is then collected and held in a reservoir tank 10.

The first casing 1 and the second casing 2 of the casing 3 are each formed from a highly corrosion resistant metal such as, for example, stainless steel, and are formed so as to present a rectangular oblong shape when seen in plan view from above. Moreover, the first casing 1 and the second casing 2 are each formed in the shape of boxes that include bottoms and whose top end sides $1a$ and $2a$ are open and whose bottom end sides $1b$ and $2b$ are closed. Of the four side walls which extend in the height direction, pairs of first side walls $1c$ and pairs of first side walls $2c$ which face each other form short sides of the top ends $1a$ and $2a$, while the remaining pairs of second side walls $1d$ and $2d$ which face each other form long sides of the top ends $1a$ and $2a$. The length of this height direction is also shorter than the length of the long sides. In other words, the first and second casings 1 and 2 are formed in oblong box shapes in which a bottom is provided and whose top portion is open. In addition, the dimensions of the long sides, short sides, and height of the second casing 2 are formed the same as the dimensions of the long sides, short sides, and height of the first casing 1.

In contrast, the first casing 1 is equipped with an intake port (i.e., a raw water intake port) $1e$ which introduces raw water W into the interior of the reservoir tank 10 inside the first casing 1, and with a partitioning plate $1f$ which is provided so as to surround the intake port $1e$. Moreover, a first drain port $1h$ that is used to discharge raw water W which is in a bottom portion $1g$ of the first casing 1 to the outside of the first casing 1 is provided in the first casing 1, and a first discharge device 11 that is used to discharge the raw water W inside the first casing 1 to the outside is provided separately from the first drain port $1h$.

As is shown in FIG. 2, the intake port $1e$ is provided in a top portion of one of the first side walls $1c$ of the first casing 1 and in the center in the transverse direction of the short sides of the first casing 1, and is formed by an inner circumferential surface of a tube-shaped component which penetrates and also protrudes from the first side wall $1c$. Furthermore, an opening/closing valve (i.e., an opening/closing device) 11 such as a butterfly valve is provided in a base portion of this tube-shaped component. This intake port $1e$ is provided at a height such that it opens onto a water surface portion H of the raw water W which is held in the reservoir tank 10 shown in FIG. 1, more specifically, at a height such that it is slightly submerged below the water surface portion H. As a result, the intake port $1e$ is constructed such that, by opening or closing the opening/closing valve using a drive device (not shown), raw water W can be introduced into the first casing 1 via the intake port $1e$ when the opening/closing valve is open, and the raw water W can be prevented from flowing into or out of the first casing 1 when the opening/closing valve is closed.

As is shown in FIG. 2 (the partitioning plate $1f$ is shown in cutaway view in FIG. 2), the partitioning plate $1f$ is formed by two plate materials that extend in parallel with each other and also in parallel with the second side walls $1d$ from each one of two side ends in the transverse direction of the outer surface of the top portion of the first side wall $1c$ where the intake port $1e$ is located, and by a rectangular plate material that extends in parallel with an outer surface of the first side wall $1c$ so as to bridge the distance between protruding ends of these two plate materials. The partitioning plate $1f$ is thus formed so as to present a U shape when seen in plan view (i.e., substantially in a U shape—one of the short sides of the two short sides of the rectangle is omitted). In addition, the top end side and bottom end side of the partitioning plate $1f$ are in an open state.

In contrast, the activated carbon cartridge 4 that is housed inside the first casing 1 is formed by a cartridge that houses a large number of activated carbon granules (i.e., activated carbon) inside, for example, a box-shaped interior having a large number of water flow holes whose diameters are smaller than the grain diameter of the activated carbon granules, or, alternatively, that internally houses a mesh body whose mesh openings are each smaller than the grain diameter of the granulated activated carbon. However, the form of the cartridge is not restricted. In the present embodiment, as is shown in FIG. 2, two activated carbon cartridges 4 that are formed as rectangular parallelepipeds are lined up in the longitudinal direction of the first casing 1 such that side surfaces $4a$ thereof are arranged in parallel with, and also facing, an inner surface of the second side wall $1d$. However, the configuration and number of the carbon cartridges 4 is not particularly restricted. Here, the activated carbon cartridges 4 have a structure that enables raw water W inside the first casing 1 to circulate from the inside to the outside of the activated carbon cartridges 4 or from the outside to the inside of the activated carbon cartridges 4 when the raw water W is being circulated by a first air diffusion apparatus (described below).

A first air diffusion apparatus 6 is formed in a tube shape having a large number of air diffusion holes, and one end of a first air feed tube $6a$ that is used to supply air to the first air diffusion apparatus 6 is connected thereto. The first air diffusion apparatus 6 is placed below the activated carbon cartridges 4 inside the first casing 1. Moreover, another end of the first air feed tube $6a$ extends to the outside from the top end $1a$ side of the first casing 1, and a blower (not shown) is connected to this other end. The primary purpose of this first air diffusion apparatus 6 is to discharge air that has been fed via the first air feed tube $6a$ from the blower into the raw water W inside the first casing 1, and to then create a flow motion in the raw water W as a result of this discharge of air so that the raw water W is made to circulate through the interior of the activated carbon cartridges 4 and come into contact sequentially with the granulated activated carbon in the activated carbon cartridges 4.

The first discharge device 11 is constructed such that one end thereof opens onto the bottom portion $1g$ side inside the first casing 1, while the other end thereof includes a first discharge pipe $11a$ (i.e., a discharge pipe) that is connected to a suction pump (not shown) that is placed outside the first casing 1. The first discharge pipe $11a$ extends from the suction pump side directly above the first casing 1 of the activated carbon cartridges 4, and is inserted in the height direction into the first casing 1 through the aperture portion in the top of the first casing 1. One end of the first discharge pipe 11a extends as far as the vicinity of the bottom portion 1g of the first casing 1.

Here, a plate-shaped first casing lid 12 is removably mounted so as to cover the aperture portion on the top end 1a side of the first casing 1, and the aperture portion on the top end 1a side of the first casing 1 is closed off by this first casing lid 12. This first casing lid 12 is provided such that the first air feed tube 6a and the first water discharge pipe 11a are inserted through insertion holes (not shown) which are provided therein.

On the other hand, unlike the first casing, an intake port and partitioning plate are not formed in the second casing 2. Instead of these, a second drain port 2h that is used to discharge raw water W inside the second casing 2 to the outside thereof is provided in a bottom portion 2g, and a second discharge device 15 is provided separately from the second drain port 2h in order to discharge raw water W inside the second casing 2 to the outside. In the same way as in the first casing 1, one end of this second discharge device 15 opens onto the bottom portion 2g side inside the second casing 2, while the other end thereof includes a second discharge pipe 15a (i.e., a discharge pipe) that is connected to a suction pump (not shown) that is placed outside the second casing 2.

The membrane module 5 that is housed inside the second casing 2 is formed, for example, by stacking a large number of elements that are formed by stretching hollow fiber membranes in a screen shape, or a large number of elements having flat membrane-shaped separation membranes, or by bundling together a large number of tubular ceramic membrane elements so that they present a substantially oblong rectangular parallelepiped shape. Both end portion 5a sides thereof are then grouped by headers or the like (not shown) so as to form a module. Moreover, in the present embodiment, the membrane module 5 is formed so as to present a substantially oblong rectangular parallelepiped shape, and a pair of side surfaces 5b that extend in the longitudinal direction thereof are positioned facing each other in parallel with the second side walls 2c of the second casing 2. In addition, in the present embodiment, one membrane module 5 is housed in the second casing 2. However, it is also possible, for example, for a plurality of membrane modules 5 to be superimposed on each other in the height direction of the second casing 2 and the type of membrane module 5 is not particularly restricted.

In addition, one end of a membrane filtration water pipe 16 which includes a suction pump (not shown) is connected to the header (not shown) that is provided at the one end portion 5a in the longitudinal direction of the membrane module 5. Raw water W inside the second casing 2 is filtered by the membrane module 5 when this suction pump is driven. The filtered water then passes through the membrane filtration water pipe 16 and is fed, for example, to a water purification tank (not shown) to which the other end of the membrane filtration water pipe 16 is connected.

The second air diffusion apparatus 7 is formed in the same way as the aforementioned first air diffusion apparatus 6. One end of a second air feed tube 7a is connected to a second air diffusion apparatus 7, and the second air diffusion apparatus 7 is placed beneath the membrane module 5. A blower (not shown) whose other end side extends outwards from the top end 2a side of the second casing 2 is connected to the second air feed tube 7a. The primary purpose of this second air diffusion apparatus 7 is to discharge air that has been fed from the blower via the second air feed tube 7a into the raw water W inside the second casing 2, and to then cause the resulting air bubbles to come into contact with the membrane modules 5 located above them. By also creating a flow motion in the raw water W, adhered matter (i.e., impurities) that has become adhered to the outer surface of the membrane module 5 during the filtering of the raw water W is removed.

Moreover, a plate-shaped second casing lid 17 is removably mounted so as to cover the aperture portion on the top end 2a side of the second casing 2. This second casing lid 17 is provided such that the second air feed tube 7a, the second water discharge pipe 15a, and the membrane filtration water pipe 16 are inserted through insertion holes (not shown) which are provided therein.

The casing 3 which includes the first casing 1 and the second casing 2 which are constructed in the manner described above is formed with the first casing 1 and the second casing 2 formed into a single body by an appropriate device with one of the second side walls 1d of the pair of second side walls 1d of the first casing 1 and one of the second side walls 2d of the pair of second side walls 2d of the casing 2 placed adjacent to each other while being parallel with and facing each other, and also with the top end 1a and the bottom end 1b of the first casing 1 and the top end 2a and the bottom end 2b of the second casing 2 positioned such that their respective horizontal positions match each other.

Moreover, a connecting pipe 20 that is shaped like a rectangle when seen in plan view from which one of the two short sides of the rectangle has been removed, or that extends in a U shape is provided in the casing 3 of the present embodiment. This connecting pipe 20 connects together the interiors of the first casing 1 and the second casing 2. One end of this connecting pipe 20 is connected to the first side wall 1c that faces the first side wall 1c of the first casing 1 where the intake port 1e is provided, while the other end thereof is connected to the first side wall 2c of the second casing 2 that faces in the same direction as the first side wall 1c of the first casing 1 to which the one end is connected. This connecting pipe 20 is able to feed the raw water W inside the first casing 1 into the interior of the second casing 2 and is positioned such that, when the filtration unit A has been immersed into the raw water W which is being held in the reservoir tank 10, the one end and the other end are located below the water surface portion H of the raw water W in the reservoir tank 10 and are also located on the water surface portion H side. Moreover, an opening/closing valve (i.e., another opening/closing device) 20a such as, for example, a butterfly valve that is able to close off the connecting pipe 20 is provided on the other end side of the connecting pipe 20.

Furthermore, a pair of supporting components 21 and 22 that support the casing 3 by suspending it in the raw water W inside the reservoir tank 10 are mounted on the casing 3 of the present embodiment. This pair of supporting components 21 and 22 are created by forming a metal material such as, for example, stainless steel into a cylindrical shape or pipe shape having a rectangular cross section (i.e., in a square pipe shape). The one supporting component 21 is fixed by being fastened with bolts or by being bonded by welding onto an outer side top end of the top end 1a of the outwardly facing second side wall 1d of the pair of second side walls 1d of the first casing 1 such that the longitudinal direction of the supporting component 21 is parallel with the top end 1a of this second side wall 1d. The other supporting component 22 is fixed by being fastened with bolts or by being bonded by welding onto an outer side top end of the top end 2a of the outwardly facing second side wall 2d of the pair of second side walls 2d of the second casing 2 such that the longitudinal direction of the supporting component 22 is parallel with the top end 2a of this second side wall 2d. Moreover, this pair of supporting components 21 and 22 are provided so as to be parallel with each other, and such that the two end portions 21a and 22a of the respective supporting components 21 and 22 protrude for the same distance as each other from the pair of first side walls 1c and 2c of each of the first casing 1 and the second casing 2.

In a state in which the bottom portions 1g and 2g of the casing 3 are facing downwards and the height direction thereof is oriented in the vertical direction, the pair of supporting components 21 and 22 immerse the casing 3 by suspending it in the raw water W inside the reservoir tank 10 by mounting or affixing bottom surfaces of the two end portions 21a and 22a that protrude from the first side walls 1c and 2c onto supporting portions such as a frame or rails (not shown) that extend across the top of the reservoir tank 10 containing raw water W, or on aperture end surfaces on the two sides that sandwich the top side aperture portion of the reservoir tank 10. At this time, in a state in which the casing 3 is immersed by being suspended in the raw water W by the supporting components 21 and 22, the activated carbon cartridges 4 that are housed in the first casing 1 and the membrane module 5 that is housed in the second casing 2 are immersed in the raw water W that has been introduced into the first and second casings 1 and 2, and the intake port 1e and the partitioning plate 1f of the first casing 1 are positioned at the height of the water surface portion H of the raw water W. In contrast, the top ends 1a and 2a of the first and second casings 1 and 2 are placed at a higher position than the water surface portion H.

Next, a method of performing purification treatment on raw water W using a filtration unit A having the above described structure will be described.

Firstly, the supporting components 21 and 22 of the filtration unit A having the above described structure are mounted or fixed onto supporting portions such as a frame or rails (not shown) of the reservoir tank 10 containing raw water W, or onto aperture end surfaces on the two sides that sandwich the top side aperture portion of this reservoir tank 10, so that the casing 3 is immersed in the raw water W inside the reservoir tank 10 by being suspended therein. At this stage, the intake port 1e of the first casing 1 is held in a closed state by the opening/closing valve (i.e., opening/closing device) 1i. Moreover, the connecting pipe 20 is also closed by the opening/closing valve (i.e., the other opening/closing device) 20a that is provided on the other end side.

Next, at the stage when this filtration unit A has been installed, the opening/closing valve 1i of the intake port 1e that is positioned at the height of the water surface portion H of the raw water W inside the reservoir tank 10 is driven, so that the intake port 1e is opened up and the raw water W is introduced into the interior of the first casing 1. At this time, in the filtration unit A of the present embodiment, even if, for example, coarse matter and the like that was not completely removed remains suspended in the raw water W in the reservoir tank 10, because the partitioning plate 1f is provided so as to surround the intake port 1e, the raw water W that is introduced into the first casing 1 through the intake port 1e does not contain any coarse matter. In this manner, the raw water W is introduced into the first casing 1, and the activated carbon cartridges 4 and the first air diffusion apparatus 6 are immersed in this raw water W. In addition, at the stage when the water level of the raw water W in the first casing 1 matches the water level of the raw water W inside the reservoir tank 10, the feed of the raw water W to the interior of the first casing 1 is stopped, and the intake port 1e is closed by the opening/closing valve 1i.

At this stage, air is fed from the first air feed tube 6a which is connected to the first air diffusion apparatus 6 to the first air diffusion apparatus 6 by the driving of the blower, and this air is discharged into the raw water W inside the first casing 1. The discharged air creates a flow motion in the raw water W, and the raw water W is circulated as a result of this flow motion into the interior of the activated carbon cartridges 4 where organic matter and the like in the raw water W is absorbed and removed by granulated activated carbon. At this time, because the granulated activated carbon of the present embodiment is formed as an aggregate body in a cartridge shape so as to create the activated carbon cartridges 4, the individual activated carbon grains do not move in a dispersed state in conjunction with the flow motion of the raw water W as is the case in a conventional drinking water treatment plant.

In this manner, at the stage when treatment of the raw water W that has been introduced into the first casing 1 by the activated carbon cartridges 4 is completed, the opening/closing valve 20a that is provided in the connecting pipe 20 is driven so that the connecting pipe 20 is placed in an open state. As a result, the raw water W inside the first casing 1 is supplied from the first casing 1 through the connecting pipe 20 to the second casing 2. At this time, in the filtration unit A of the present embodiment, because the granulated carbon in the first casing 1 is in cartridge form and does not become dispersed in the raw water W in the first casing 1, the granulated carbon does not escape from the first casing 1 together with the raw water W that is supplied to the second casing 2. Meanwhile, the water level of the raw water W inside the first casing 1 is lowered in conjunction with the supply of the raw water W to the second casing 2, and the opening/closing valve 1i is driven into an open state, and new raw water W is introduced from the reservoir tank 10 via the intake port 1e to the interior of the first casing. In addition, as is described above, the opening/closing valve 1i is closed and the raw water W that has been newly introduced into the first casing 1 is made to circulate inside the first casing 1 by the discharge of air from the first air diffusion apparatus 6, and is sequentially purified by the activated carbon cartridges 4.

At the stage when the membrane module 5 and the second air diffusion apparatus 7 are immersed in the raw water W that has been supplied from the first casing 1 to the second casing 2, the suction pump that is provided in the membrane filtration water pipe 16 is driven so that the raw water W inside the second casing 2 is made to circulate through the membrane module 5 and become filtered. The filtered water is then fed through the membrane filtration water pipe 16 to a reservoir tank to which the other end of the membrane filtration water pipe 16 is connected. In addition, by discharging air from the second air diffusion apparatus 7 into the raw water W at the same time as the raw water W is being filtered by the membrane module 5, adhered matter that has adhered to the outer surface of the membrane module 5 is quickly removed by the air bubbles of the discharged air, and it is possible to perform filtration while maintaining the filtration performed by the membrane module 5 at a high level.

Moreover, in the filtration unit A of the present embodiment, the raw water W inside the second casing 2 is filtered by the membrane module 5, and is fed to the outside of the filtration unit A as filtered water so that there is a drop in the water level of the raw water W inside the second casing 2. In addition, the opening/closing valve 20a of the connecting pipe 20 is placed in an open state, and raw water W is supplied from the first casing 1 to the second casing 2 through this connecting pipe 20. As a result, the raw water W inside the reservoir tank 10 is sequentially supplied from the first casing 1 to the second casing 2, and is sequentially processed during this motion by the activated carbon cartridges 4 and the membrane module 5, thereby making it possible for pure water to be obtained.

On the other hand, when raw water W is being treated by the above described filtration unit A, as the treatment proceeds, biological slime and polymeric organic material, as well as impurities such as metal precipitates and the like contained in the raw water W are adhered to the surface of the granulated carbon in the activated carbon cartridges 4 and to the outer surface of the membrane module 5 so that the adhesion abilities and filtration abilities of each of these gradually deteriorate. Because of this, it becomes necessary to replace or clean the activated carbon cartridges 4 and membrane modules 5. In this case, in the present embodiment, firstly, the respective opening/closing valves 1i and 20a of the intake port 1e and the connecting pipe 20 are closed. Bubbles from the air that has been discharged from each of the first air diffusion apparatus 6 and the second air diffusion apparatus 7 are brought into contact with the raw water W and, because of the motion of the raw water W that is created by the discharged air, adhered matter that has adhered to the surface of the granulated carbon and to the outer surface of the membrane module 5 is peeled off and removed. Furthermore, in the membrane module 5, filtered water is supplied to the membrane module 5 through the membrane filtration water pipe 16 in the opposite direction from the direction when it is being filtered, and adhered matter that has become blocked in the internal holes of the membrane module 5 and adhered matter on the outer surface is expelled onto the raw water W side, thereby performing back pressure cleaning of the membrane module 5.

In addition, in the filtration module A of the present embodiment, at the stage when the above described cleaning is ended, the raw water W that is suspended in the first casing 1 and the second casing 2 as a result of the removal of the adhered matter is discharged by the first discharge device (i.e., the water discharge pipe 11a) 11 and the second discharge device (i.e., the water discharge pipe 15a) 15 to the outside from the first casing 1 and the second casing 2. As a result, the adhesion abilities of the granulated activated carbon in the activated carbon cartridges 4 and the filtration abilities of the membrane module 5 are restored. At this stage, the opening/closing valve 1i is once again driven as is described above so that the intake port 1e is placed in an open state and the raw water W inside the reservoir tank 10 is introduced into the casing 3. Cleaning processing is then recommenced enabling filtered water to be obtained. When the activated carbon cartridges 4 and the membrane module 5 are being replaced, at the stage when the raw water W is discharged from the first casing 1 and the second casing 2 by the first discharge device (i.e., the water discharge pipe 11a) 11 and the second discharge device (i.e., the water discharge pipe 15a) 15, the first casing lid 12 and at the second casing lid 17 are removed and the activated carbon cartridges 4 and the membrane module 5 are removed to the outside via the respective aperture portions. New activated carbon cartridges 4 and a new membrane module 5 are then installed.

Accordingly, according to the filtration unit A having the above described structure, by immersing the casing 3 in the raw water W inside the reservoir tank 10, it is possible to introduce the raw water W from the reservoir tank 10 into the interior of the first casing 1 via the intake port 1e of which at least a portion is in contact with the water surface portion H of the raw water W. It is thus possible even when, for example, raw water W containing a large quantity of suspended matter is to be treated to precipitate this out to a certain extent inside the reservoir tank 10, and to introduce supernatant raw water W that has little suspended matter and is comparatively clean into the casing 3. Accordingly, it is possible to reduce adhered matter that is adhering to the activated carbon cartridges 4 and the membrane module 5. As a result, it is possible while treating the raw water W to maintain the absorption capabilities of the activated carbon cartridges 4 and the filtration performance of the membrane module 5 at high levels over a considerable period of time. Note that in the above description, a structure is employed in which at least a portion of the intake port 1e is in contact with the water surface portion H of the raw water W. However, instead of this structure, it is also possible to employ a structure in which the entire intake port 1e is immersed in the raw water W, and at least a portion of the intake port 1e is positioned adjacent to the water surface portion H of the raw water W.

Moreover, as a result of the intake port 1e being provided in the first casing 1, and as a result of the connecting pipe 20 which connects the first casing 1 to the second casing 2 being provided, it is possible to introduce the raw water W, which is inside the reservoir tank 10 into which the filtration unit A has been immersed, into the first casing 1 through the intake port 1e using the difference in water level, and to supply raw water W from the first casing 1 to the second casing 2 using the difference in water level between the raw water W in the first casing 1 and the raw water W in the second casing 2. By employing this method, it is possible to perform purification treatment on raw water W that is sequentially fed using the activated carbon cartridges 4 that are contained in the first casing 1 and the membrane module 5 that is contained in the second casing 2. Moreover, even when a structure is employed in which the connecting pipe 20 is provided as is described above and raw water W is supplied from the first casing 1 to the second casing 2, because the granulated activated carbon contained in the first casing 1 has been formed into cartridges in the shape of the activated carbon cartridges 4 and does not, therefore, become dispersed within the raw water W inside the first casing 1, it is possible to prevent granulated carbon flowing out from the first casing 1 together with the raw water W that is supplied to the second casing 2. Accordingly, in the filtration unit A of the present embodiment, because there is no reduction in the amount of activated carbon inside the first casing 1, and because activated carbon does not become adhered to the membrane module 5 in the second casing 2, purification treatment of the raw water W can be carried out under excellent conditions.

Furthermore, in the filtration unit A of the present embodiment, by providing the first air diffusion apparatus 6 below the activated carbon cartridges 4, a flow motion can be created in the raw water W inside the first casing 1, so that the raw water W can be made to circulate inside the activated carbon cartridges 4 by this flow motion of the raw water W, and the raw water W can be brought into contact sequentially with the granulated carbon inside the activated carbon cartridges 4. As a result, even when the granulated carbon is in the form of a cartridge, it is possible to reliably perform the treatment of the raw water W using granulated carbon. Moreover, by providing the second air diffusion apparatus 7 below the membrane module 5 in addition to the first air diffusion apparatus 6, air can be discharged into the raw water W from the respective air diffusion apparatuses 6 and 7 into the first casing 1 and the second casing 2, so that adhered matter that is adhering to the activated carbon cartridges 4 and the membrane module 5 can be removed by the air bubbles from the discharged air that are brought into contact with the activated carbon cartridges 4 and membrane module 5 located above them, or else by the flow motion of the raw water W that is created by the discharge of air. Note that, as is described above, it is effective if back pressure cleaning of the membrane module 5 is also performed concurrently at this time. This makes it possible to prevent any deterioration in the adhesive capabilities of the granulated activated carbon and the filtration properties of the membrane module that is caused by adhered matter. Furthermore, because it is possible to maintain the dissolved oxygen concentration of the raw water W at a high level if air is discharged into the raw water W from the first air diffusion apparatus 6 and the second air diffusion apparatus 7, when, for example, aerobic microorganisms are adhering to the activated carbon cartridges 4, organic matter in the raw water W and organic matter adhering to the activated carbon cartridges 4 and the membrane module 5 can be decomposed by these aerobic microorganisms. As a result, it is possible to achieve an acceleration in the purification treatment of the raw water W, and the effect is obtained that it is possible to prevent any deterioration in the adhesive capabilities of the granulated activated carbon and the filtration properties of the membrane module 5.

Moreover, because the intake port 1e that is used to introduce the raw water W which needs to undergo purification treatment is provided in the first casing 1, by directly immersing the casing 3 of the filtration unit A in the reservoir tank 10 which is holding the raw water W, this raw water W can be introduced into the casing 3 and purification treatment can be performed thereon. As a result, purification treatment of the raw water W can be performed without it being necessary to provide another site in order to perform the purification treatment of the raw water W. Moreover, at this time, as a result of the opening/closing valve (i.e., the opening/closing device) 1i being provided in the intake port 1e, it also becomes possible to control the inflow of raw water W into the first casing 1. Because of this, as is described above, even when there is a rise in the water level of the raw water W inside the first casing 1 that is caused by the aeration cleaning by the air bubbles from the first air diffusion apparatus 6, it is possible to prevent the raw water W inside this first casing 1 flowing back to the outside of the casing 3. Furthermore, as a result of the opening/closing valve (i.e., the other opening/closing device) 20a being provided in the connecting pipe 20 as well that connects the first casing 1 and the second casing 2, in conjunction with the opening/closing valve 1i of the intake port 1e, it is possible to control the entry of the raw water W into the first casing 1 and the second casing 2. Accordingly, even if there is a rise in the water level of the raw water W inside the second casing 2 that is due to the above-described aeration cleaning by the air bubbles from the second air diffusion apparatus 7 and back pressure cleaning of the membrane module 5, it is possible to prevent backflow of the raw water W inside the second casing 2 into the first casing 1. However, of these, it is also possible for the opening/closing valve 20a (i.e., the other opening/closing device) on the connecting pipe 20 to not be provided, namely, it is also possible for the raw water W introduced into the casing 3 to be treated by being continuously circulated between the separated first casing 1 on the activated carbon cartridges 4 side and second casing 2 on the membrane module 5 side.

Note that the present invention is not limited to the above-described first embodiment and various modifications may be made there to insofar as they do not depart from the spirit or scope of the present invention. For example, in the present embodiment, a description is given of when the activated carbon that has been formed into cartridges in the shape of the activated carbon cartridges 4 is granulated activated carbon. However, provided that the activated carbon does not become dispersed, the form thereof is not particularly restricted, and it is also possible for the activated carbon cartridges 4 to be formed using, for example, fibrous activated carbon or honeycomb activated carbon. Moreover, if biological activated carbon which is obtained by causing aerobic microorganisms to adhere to activated carbon is used, the effect can be obtained that organic matter adhering to the activated carbon is decomposed and the lifespan of the activated carbon can be extended.

Figure 3:
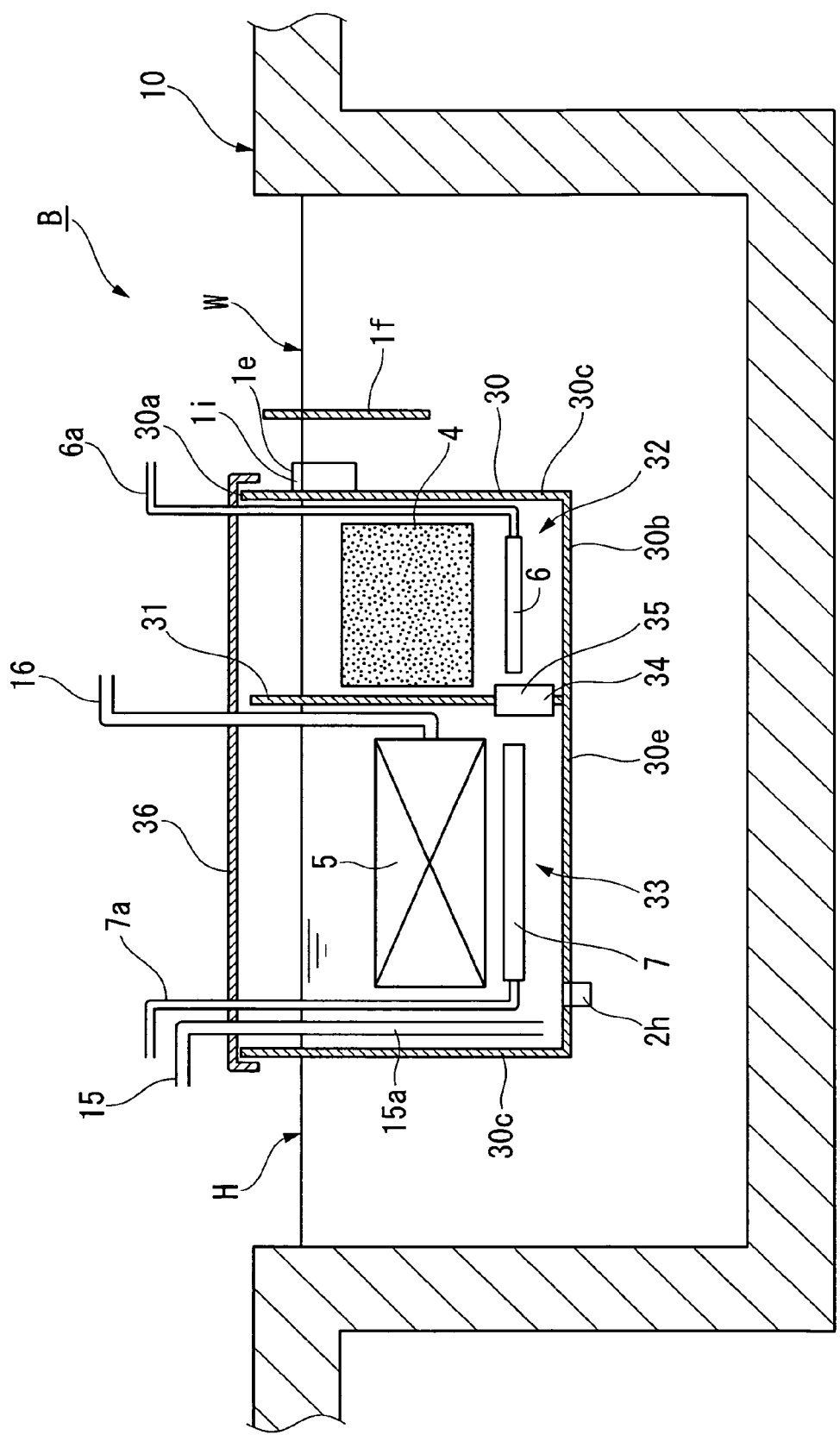
FIG. 3 is a view showing a filtration unit according to a second embodiment of the present invention.
Figure 4:
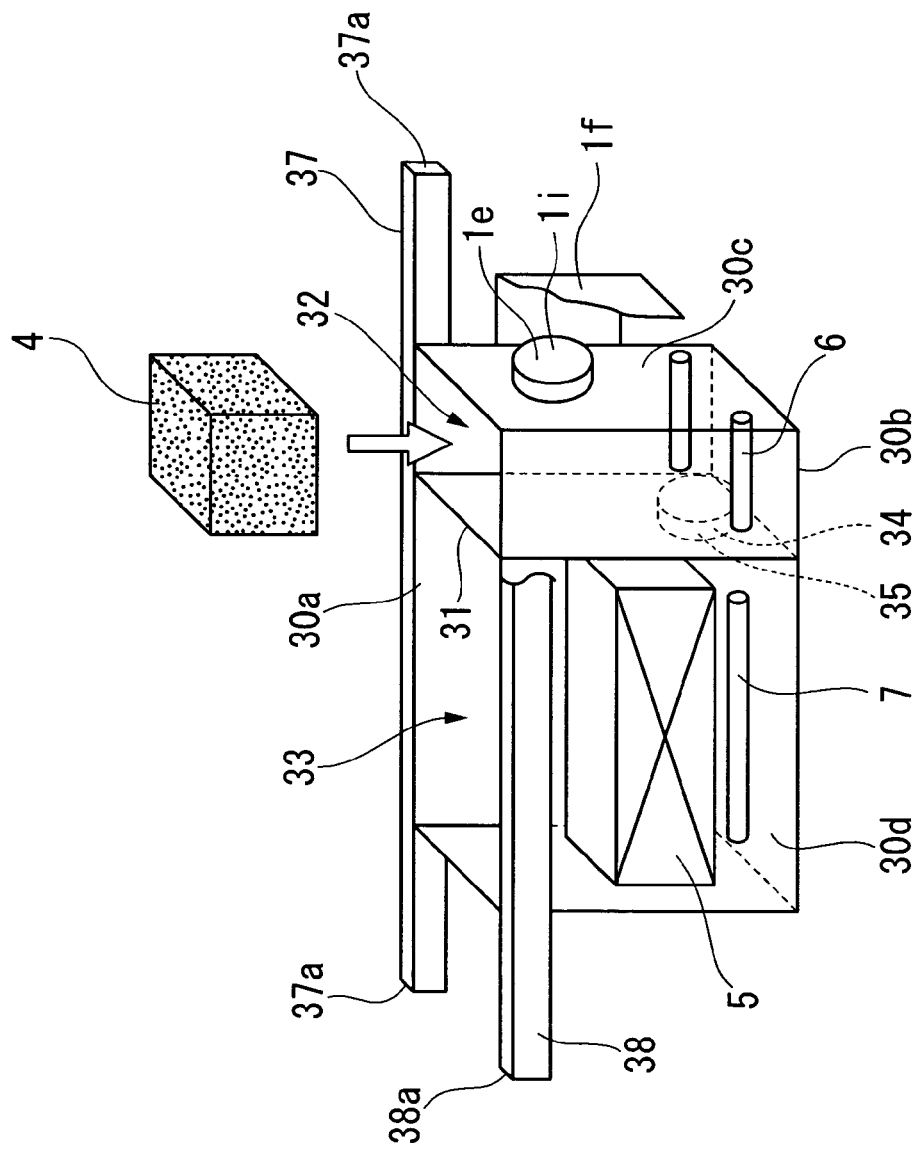
FIG. 4 is a view showing the filtration unit according to the second embodiment of the present invention.

Next, a filtration unit according to a second embodiment of the present invention will be described with reference made to FIG. 3 and FIG. 4. In the description of the present embodiment, the same symbols are used for structure that is common to the first embodiment and a detailed description thereof is omitted.

The filtration unit A shown in the first embodiment is formed by providing a casing 3 that is made up of an individual first casing 1 and second casing 2. In contrast, as is shown in FIG. 3 and FIG. 4, in a filtration unit B of the present embodiment, an activated carbon cartridge 4 and a membrane module 5 are housed in a single casing 30. A partitioning wall 31 is provided in this casing 30 between the activated carbon cartridge 4 and the membrane module 5 which separates the raw water W on the activated carbon cartridge 4 side from the raw water W on the membrane module 5 side while also providing a connection between the two.

Here, the casing 30 of the present embodiment is formed from a highly corrosion resistant metal such as, for example, stainless steel, and is formed so as to present a rectangular oblong shape when seen in plan view from above. This casing 30 is formed in the shape of a box that includes a bottom, and whose top end side 30a is open and whose bottom end side 30b is closed. Of the four side walls which extend in the height direction of the casing 30, a pair of first side walls 30c which face each other form short sides of the top end 30a, while the remaining pair of second side walls 30d which face each other form long sides of the top end 30a. The casing 30 is thus formed in an oblong box shape in which a bottom is provided and whose top portion is open. The partitioning wall 31 is provided in parallel with the first side walls 30c and offset from the center in the longitudinal direction of the casing 30 towards one first side wall 30c. End portions on both sides of the partitioning wall 31 are connected respectively to each of the pair of second side walls 30d, and a bottom edge of the partitioning wall 31 is connected to a bottom portion 30e of the casing 30. The interior of the casing 30 that is constructed in this manner is separated by the partitioning wall 31 into a larger and a smaller compartment. The smaller compartment forms a first compartment 32 that houses the activated carbon cartridge 4, while the larger compartment forms a second compartment 33 that houses the membrane module 5.

A connecting port 34 that connects together the interiors of the first compartment 32 and the second compartment 33 is provided in the partitioning wall 31 substantially in the center in the transverse direction which runs along the short sides of the casing 30 on the bottom portion 30e side of the casing 30. This connecting port 34 is formed by an inner circumferential surface of a tube-shaped component which penetrates the partitioning wall 31 and whose end portions protrude respectively into the first compartment 32 and the second compartment 33. Furthermore, an opening/closing valve (i.e., another opening/closing device) 35 such as a butterfly valve is provided in a center portion in the axial direction of this tube-shaped component, so that the connecting port 34 can be either opened or closed.

Furthermore, in the filtration unit B of the present embodiment, a structure is employed in which an intake port 1e and a partitioning wall 1f that are formed in the same way as in the first embodiment are provided in a first side wall 30c on the first compartment 32 side of the casing 30, such that the raw water W in the reservoir tank 10 can be introduced into the first compartment 32. Moreover, in the same way as in the first casing 1, the first air diffusion apparatus 6 and the first air feed tube 6a that is connected to this are provided together with the activated carbon cartridge 4 below the activated carbon cartridge 4 in the first compartment 32 which corresponds to the first casing 1 of the first embodiment. In contrast to this, in the same way as in the second casing 2, the second air diffusion apparatus 7 is provided together with the membrane module 5 below the membrane module 5 in the second compartment 33 which corresponds to the second casing 2 of the first embodiment. In addition, the membrane filtration water pipe 16 that is connected to the header of the membrane module 5, the second air feed tube 7a that is connected to the second air diffusion apparatus 7, and the second discharge apparatus (i.e., water discharge pipe 15a) 15 and second drain port 2h that are used to discharge the raw water W inside the second compartment 33 to the outside are provided in the second compartment 33. Here, the first discharge apparatus 11 and the first drain port 1h are not provided in the first compartment 32.

In addition, in the filtration unit B of the present embodiment, aperture portions that are open in top portions of both the first compartment 32 and the second compartment 33 are covered and sealed by a single removably mounted plate-shaped casing lid 36. Moreover, a pair of supporting components 37 and 38 that support the casing 3 by suspending it in the raw water W inside the reservoir tank 10 are mounted on the casing 3. This pair of supporting components 37 and 38 are fixed onto outer side end portions of the top ends 30a of each of the pair of second side walls 30d of the casing 30 such that the longitudinal directions thereof are parallel with each other and are also parallel with the top ends 30a of the second side walls 30d. Moreover, this pair of supporting components 37 and 38 are provided such that the two end portions 37a and 38a thereof protrude outwards for the same distance as each other from the pair of first side walls 30c.

Next, a method of performing purification treatment on raw water W using a filtration unit B having the above described structure will be described.

The supporting components 37 and 38 of the filtration unit B having the above described structure are mounted or fixed onto supporting portions of the reservoir tank 10, or onto aperture end surfaces on the two sides that sandwich the top side aperture portion of this reservoir tank 10, so that the casing 30 is immersed into the raw water W inside the reservoir tank 10 by being suspended therein. At this time, the intake port 1e is held in a closed state by the opening/closing valve 1i. Moreover, the connecting pipe 34 is also closed by the opening/closing valve 35. In addition, the opening/closing valve 1i of the intake port 1e that is positioned at the height of the water surface portion H of the raw water W inside the reservoir tank 10 is driven so that the intake port 1e is placed in an open state and raw water W is introduced into the interior of the first compartment 32. As a result, the activated carbon cartridge 4 and the first air diffusion apparatus 6 that are housed in the first compartment 32 are immersed in the raw water W, and at the stage when a predetermined quantity of raw water W has been supplied to the first compartment 32, the opening/closing valve 1i is driven so that the intake port 1e is closed. At this time, in the same way as in the first embodiment, coarse matter and the like is prevented from flowing into the casing 30 by the partitioning plate 1f.

At this stage, air is discharged from the first air diffusion apparatus 6 into the raw water W inside the first compartment 32 creating a flow motion in the raw water W, and organic matter and the like in the raw water W is absorbed and removed by the activated carbon cartridge 4. At the stage when the raw water W introduced into the first compartment 32 has been treated by the activated carbon cartridge 4 in this manner, the opening/closing valve 35 of the connecting pipe 34 is driven so that the connecting pipe 34 is placed in an open state. As a result, the raw water W inside the first compartment 32 is supplied to the second compartment 33, and the water level of the raw water W inside the second compartment 33 is lowered. At this stage, the opening/closing valve 35 is driven thereby closing the connecting port 34, and the opening/closing valve 1i is driven so as to place the intake port 1e in an open state. As a result, new raw water W is introduced into the first compartment 32 due to the difference between the water level of the raw water W in the first compartment 32 and the water level of the raw water W in the reservoir tank 10. At this time, because the granulated activated carbon in the first compartment 32 is in the form of the activated carbon cartridge 4 and does not become dispersed in the raw water W in the first compartment 32, granulated activated carbon does not flow out from the first compartment 32 together with the raw water W that is supplied to the second compartment 33. Moreover, at the stage when raw water W is fed from the first compartment 32 to the second compartment 33 and new raw water W is introduced into the first compartment 32, air is discharged from the first air diffusion apparatus 6, and the raw water W inside the first compartment 32 is sequentially purified by the activated carbon cartridge 4.

At the stage when the membrane module 5 and the second air diffusion apparatus 7 are immersed in the raw water W that has been supplied from the first compartment 32 to the second compartment 33, the suction pump that is provided in the membrane filtration water pipe 16 is driven so that the raw water W inside the second compartment 33 is filtered by the membrane module 5, and the filtered water is then fed through the membrane filtration water pipe 16 to a reservoir tank (not shown). In addition, air is discharged from the second air diffusion apparatus 7 into the raw water W at the same time as the raw water W is being filtered by the membrane module 5, so that filtration is performed while adhered matter that has adhered to the outer surface of the membrane module 5 is quickly removed by the flow motion of the raw water W that is created by the air bubbles of the air or by the discharged air.

Moreover, in the filtration unit B of the present embodiment, when the raw water W inside the second compartment 33 is filtered by the membrane module 5 so that there is a drop in the water level of the raw water W inside the second compartment 33, the opening/closing valve 35 is driven so that the connecting pipe 34 is placed in an open state. The raw water W is then supplied from the first compartment 32 to the second compartment 33 due to the difference with the water level of the raw water W inside the first compartment 32. As a result, the raw water W inside the reservoir tank 10 is sequentially supplied from the first compartment 32 to the second compartment 33, and is sequentially processed during this movement by the activated carbon cartridges 4 and the membrane module 5, thereby making it possible for pure water to be obtained.

Accordingly, according to the filtration unit B having the above described structure, by providing the partitioning wall 31 in the single casing 30, it is possible to provide the first compartment 32 and the second compartment 33 that separately house the activated carbon cartridge 4 and the membrane module 5 in the casing 30. In addition, as a result of the connecting pipe 34 that is able to connect together the first compartment 32 and the second compartment 33 being provided in the partitioning wall 31, and the intake port 1e being provided in the first side wall 30c on the first compartment 32 side, it is possible to introduce raw water W into the first compartment 32 simply by immersing the filtration unit A into the raw water W, and treat this raw water W using the activated carbon cartridge 4. It is also possible to feed the raw water W that has been treated by this activated carbon cartridge 4 to the second compartment 33, and filter it using the membrane module 5. Moreover, at this time, because the granulated activated carbon that is contained in the first compartment 32 is in cartridge form, when the raw water W is fed from the first compartment 32 to the second compartment 33, the granulated activated carbon can be prevented from escaping, so that it is possible to prevent the granulated activated carbon becoming adhered to the membrane module 5 and causing a deterioration in the filtration efficiency. It is thus possible for the purification treatment of the raw water W to be performed properly.

Moreover, at this time, as a result of the opening/closing valve (i.e., the opening/closing device) 1i being provided in the intake port 1e, and as a result of the opening/closing valve (i.e., the other opening/closing device) 35 being provided in the connecting port 34 that connects together the first compartment 32 and the second compartment 33 in the partitioning wall 31, it is possible to control the entry of the raw water W into the casing 30, and to control the circulation of the raw water W from the first compartment 32 which is the side where the activated carbon cartridge 4 is located to the second compartment 33 which is the side where the membrane module 5 is located. Accordingly, even if there is a rise in the water level of the raw water W that is due to the aeration cleaning by the air bubbles from the first air diffusion apparatus 6 and the second air diffusion apparatus 7 and to the back pressure cleaning of the membrane module 5, it is possible to prevent backflow of this raw water W.

Figure 5:
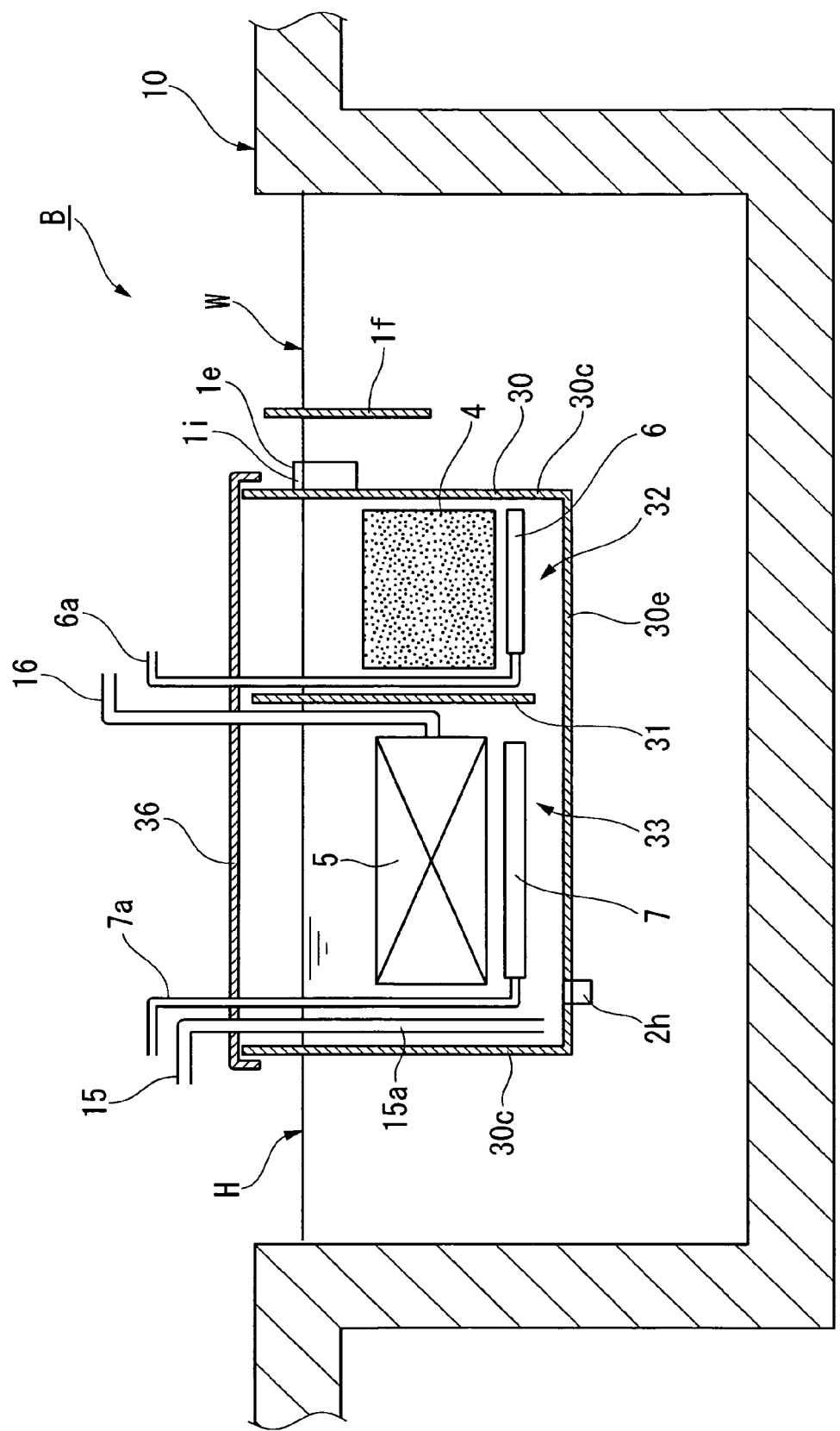
FIG. 5 is a view showing a variant example of the filtration unit according to the second embodiment of the present invention.
Figure 6:
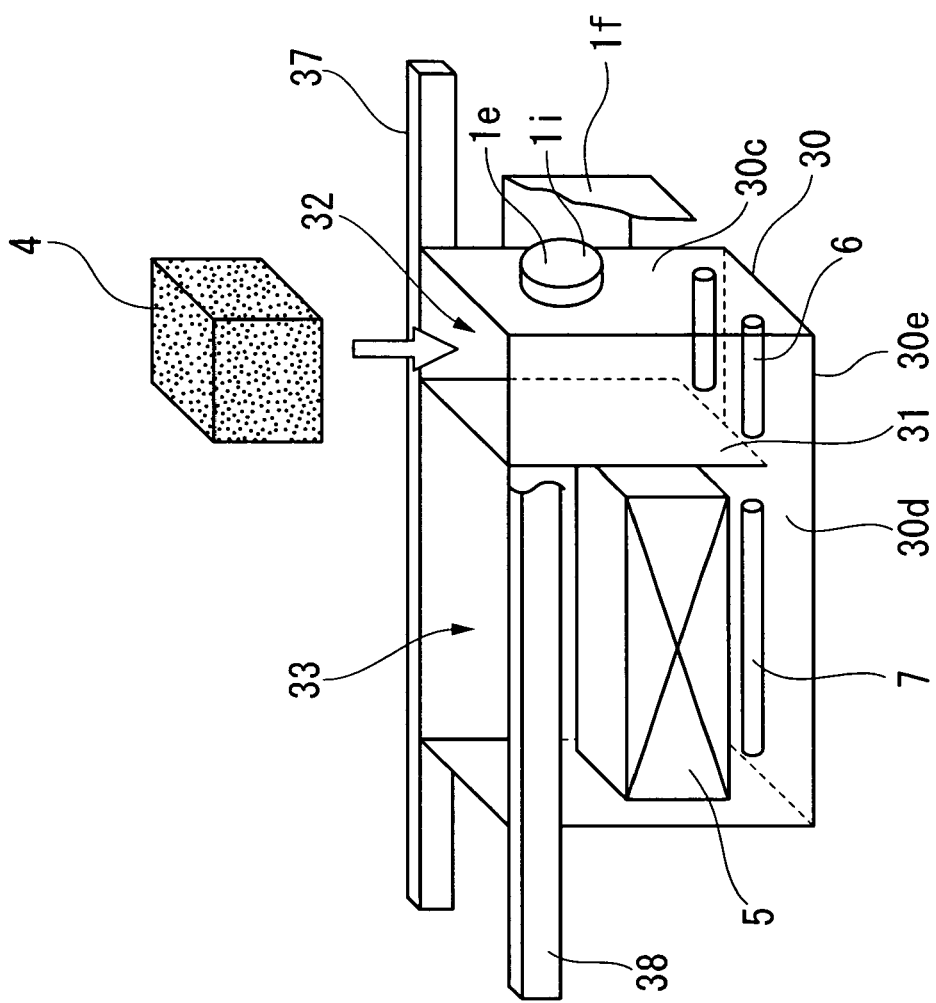
FIG. 6 is a variant example of the filtration unit according to the second embodiment of the present invention.

Note that the present invention is not limited to the above described second embodiment, and various modifications may be made thereto insofar as they do not depart from the spirit or scope of the present invention. For example, in the present embodiment, the partitioning wall 31 is constructed such that the first compartment 32 and the second compartment 33 are connected as a result of the two side end portions of the partitioning wall 31 that partitions the first compartment 32 from the second compartment 33 inside the casing 30 being connected to the pair of second side walls 30d of the casing 30, and the bottom end of the partitioning wall 31 being connected to the bottom portion 30e of the casing 30, and as a result of the connecting port 34 that includes the opening/closing valve 35 (i.e., the other opening/closing device) being provided in this partitioning wall 31. However, as is shown in FIG. 5 and FIG. 6, for example, it is also possible to provide a gap between the bottom edge of the partitioning wall 31 and the bottom portion 30e of the casing 30, and to supply the raw water W in the first compartment 32 to the interior of the second compartment 33 through this gap. Specifically, it is not essential for the other opening/closing device to be provided in the partitioning wall 31. Moreover, conversely to this, it is also possible to provide, for example, a freely opening and closing door (i.e., another opening/closing device) in this gap between the bottom edge of the partitioning wall 31 and the bottom portion 30e of the casing 30, and for the supply of the raw water W from the interior of the first compartment 32 to the interior of the second compartment 33 to be controlled by this door.

INDUSTRIAL APPLICABILITY

The present invention is a filtration unit that is able to purify raw water that requires purification treatment by being immersed in the raw water, and that can favorably purify the raw water without activated carbon escaping onto the membrane module side.

The invention claimed is:

1. A filtration unit that is immersible in raw water that is held inside a reservoir tank or a reservoir pond, and comprises a membrane module that filters the introduced water, comprising:

a casing which is in the shape of a box having a bottom and includes the membrane module housed on a membrane module side of the casing and an activated carbon cartridge housed on an activated carbon cartridge side of the casing, the activated carbon cartridge having activated carbon provided in cartridge form therein; and a support for supporting the casing by suspending it in the raw water, wherein the casing is provided with an intake port extending through a vertical sidewall thereof to introduce the raw water into an interior of the casing, and a first opening/closing device that is installed on this intake port and controls a flow of the raw water into the interior of the casing, and the activated carbon cartridge side and the membrane module side are spatially separated within the casing so as to allow the raw water introduced into the interior of the casing to circulate from the activated carbon cartridge side to the membrane module side, and wherein the casing comprises a partitioning wall, positioned to separate the activated carbon cartridge from the membrane which are housed in the casing, and a connecting port disposed in the partitioning wall that connects the activated carbon cartridge to the membrane module and is adapted to allow the water which is introduced into the interior of the casing to circulate from the activated carbon cartridge side to the membrane module side, and wherein a second opening/closing device is provided in the connecting port and is adapted to prevent the raw water from counter-flowing from the separated membrane module side to the separated activated carbon cartridge side, and wherein the second opening/closing device includes a shut off valve, and is provided with a tube-shaped component which has a predetermined length and which connects the separated activated carbon cartridge side of the casing to the separated membrane module side of the casing, the second opening/closing device being capable of controlling the circulation of the raw water circulated from the separated activated carbon cartridge side of the casing to the separated membrane module side of the casing, and is adapted to be capable of closing the circulation of the raw water between the separated activated carbon cartridge side of the casing and the separated membrane module side of the casing by closing the shut off valve.

2. The filtration unit according to claim 1, the casing further comprises a first air diffusion apparatus and a second air diffusion apparatus that discharge air into the introduced raw water, wherein the first air diffusion apparatus is located below the membrane module and the second air diffusion apparatus is located below the activated carbon cartridge.

3. The filtration unit according to claim 1, wherein, when at least a portion of the inlet port is in contact with the surface of the raw water in a state in which the filtration unit is immersed in the raw water, or when the entire inlet port is in the raw water and at least a portion of the inlet port is positioned adjacent to the surface of the raw water, a partitioning plate is provided so as to surround the intake port.

4. The filtration unit according to claim 1, further comprising a discharge pipe that discharges the raw water inside the casing, and one end of the discharge pipe opens in the vicinity of the bottom portion of the casing, and another end of the discharge pipe is positioned outside the casing.

5. A filtration unit that is immersible in raw water that is held inside a reservoir tank or a reservoir pond, and comprises a membrane module that filters the introduced water, comprising:
   a first casing which is in the shape of a box having a bottom and includes an activated carbon cartridge, the activated carbon cartridge having activated carbon provided in cartridge form therein;
   a second casing which is in the shape of a box having a bottom and includes the membrane module;
   a support for supporting the first casing and the second casing by suspending it in the raw water; and
   a connecting pipe disposed outside the first casing and the second casing that connects together the interiors of the first casing and the second casing,
   wherein the first casing is provided with an intake port extending through a vertical sidewall thereof to introduce the raw water into the interior of the first casing, and a first opening/closing device that is installed on this intake port and controls a flow of the raw water into the interior of the first casing, and the raw water introduced into the interior of the first casing circulates from the first casing to the second casing, and
   wherein a second opening/closing device is provided in the connecting pipe and is adapted to prevent the water from counter-flowing from the second casing to the first casing, and
   wherein the second opening/closing device includes a shut off valve, the second opening/closing device being capable of controlling the circulation of the raw water circulated from the first casing to the second casing, and is adapted to be capable of closing the circulation of the raw water between the first and the second casings by closing the shut off valve.

6. The filtration unit according to claim 5, further comprising a first air diffusion apparatus and a second air diffusion apparatus that discharge air into the introduced raw water, wherein the first air diffusion apparatus is located below the membrane module, and the second air diffusion apparatus is located below the activated carbon cartridge.

7. The filtration unit according to claim 5, further comprising:
   a first discharge pipe that discharges the raw water inside the first casing; and
   a second discharge pipe that discharges the raw water inside the second casing,
   wherein a first end of the first discharge pipe opens in the vicinity of the bottom portion of the first casing and a second end of the first discharge pipe is positioned outside the first casing, and wherein a first end of the second discharge pipe opens in the vicinity of the bottom portion of the second casing and a second end of the second discharge pipe is positioned outside the second casing.

8. A filtration unit comprising:
   first and second boxes laterally spaced apart from one another and having closed bottoms and upper open ends located at the same respective heights and connected together with a support that supports the first and second boxes in a reservoir filled with raw water;
   an activated carbon cartridge located in the first box and a membrane module being located in the second box;
   an inlet port extending through a vertical side wall of the first box proximate the open upper end including a shut off valve;
   an outlet port extending through a vertical side wall of the first box;
   an inlet port extending through a vertical sidewall of the second box having a shut off valve;
   a connecting pipe that connects the outlet port of the first box to the inlet port of the second box;
   an outlet pipe extending from the membrane module through the upper open end of the second box;
   a first air diffuser pipe disposed below the activated carbon cartridge in the first box; and
   a second air diffuser pipe disposed below the membrane module in the second box.

9. The filtration unit according to claim 8, wherein the inlet port is provided on the vertical side wall of the first box such that, in a state in which the filtration unit is immersed in the raw water, at least a portion of the inlet port is positioned in the raw water.

10. A filtration unit comprising:
    a box having closed bottom and an upper open end;
    a vertical partition wall disposed in the box that defines a first chamber adjacent one side of the partition wall and a second chamber adjacent the other side of the partition wall;
    a support that supports the box in a reservoir filled with raw water;
    an activated carbon cartridge located in the first chamber and a membrane module being located in the second chamber;
    an inlet port extending through a vertical side wall of the box and into the first chamber proximate the open upper end including a shut off valve;
    a connecting port extending through the partition wall proximate the closed bottom having a shut off valve connecting the first chamber to the second chamber;
    an outlet pipe extending from the membrane module through the upper open end of the box;
    a first air diffuser pipe disposed below the activated carbon cartridge in the first chamber; and
    a second air diffuser pipe disposed below the membrane module in the second chamber.

11. The filtration unit according to claim 10, wherein the inlet port is provided on the vertical side wall of the box such that, in a state in which the filtration unit is immersed in the raw water, at least a portion of the inlet port is positioned in the raw water.

12. The filtration unit according to claim 10, wherein, when at least a portion of the inlet port is in contact with the surface of the raw water in a state in which the filtration unit is immersed in the raw water, or when the entire inlet port is in the raw water and at least a portion of the inlet port is positioned adjacent to the surface of the raw water, a partitioning plate is provided so as to surround the inlet port.

* * * * *